United States Patent [19]
Fey

[11] Patent Number: 5,620,485
[45] Date of Patent: Apr. 15, 1997

[54] SILICONE FOAM CONTROL AGENTS FOR HYDROCARBON LIQUIDS

[75] Inventor: Kenneth C. Fey, Midland, Mich.

[73] Assignee: Dow Corning Corporation, Midland, Mich.

[21] Appl. No.: 574,421

[22] Filed: Dec. 15, 1995

[51] Int. Cl.$^6$ ........................................................ C10L 1/28
[52] U.S. Cl. ............................................................. 44/320
[58] Field of Search ................................................. 44/320

[56] References Cited

U.S. PATENT DOCUMENTS

| | | | |
|---|---|---|---|
| 3,233,986 | 2/1966 | Morehouse | 44/76 |
| 3,764,282 | 10/1973 | Furlong et al. | 44/320 |
| 4,690,688 | 9/1987 | Adams et al. | 44/320 |
| 4,711,714 | 12/1987 | Callaghan et al. | 208/348 |
| 5,397,367 | 3/1995 | Fey et al. | 44/320 |

FOREIGN PATENT DOCUMENTS

| | | | |
|---|---|---|---|
| 4032006 | 4/1992 | Germany | C08G 77/38 |
| 4343235 | 12/1993 | Germany | C08G 77/46 |
| 4325359 | 2/1995 | Germany | C07F 7/18 |

*Primary Examiner*—Jacqueline V. Howard
*Attorney, Agent, or Firm*—Timothy J. Troy

[57] ABSTRACT

The present invention relates to an organopolysiloxane compound having at least one group having the formula

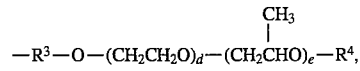

and at least one group having its formula selected from —R$^3$—C$_6$H$_5$ or —R$_3$—O—C$_6$H$_5$ per molecule wherein R$^3$ is a divalent hydrocarbon group having from 1 to 20 carbon atoms, R$^4$ is hydrogen, an alkyl group, an aryl group, or an acyl group, d has a value of 0 to 150, e has a value of 0 to 150, with the proviso that the value of d+e is at least one. The organopolysiloxane compounds of this invention reduce the amount of foam in the hydrocarbon fuel, especially in diesel fuels and jet fuels. The organopolysiloxane compound acts as a foam control agent which displays consistent compatibility and miscibility with additives which are frequently present in hydrocarbon fuels.

18 Claims, No Drawings

SILICONE FOAM CONTROL AGENTS FOR HYDROCARBON LIQUIDS

BACKGROUND OF THE INVENTION

This invention relates to silicone compounds which are useful as foam control agents in foaming systems. More particularly this invention relates to arylalkyl modified silicone polyethers and to their use as foam control agents in hydrocarbon liquids.

Current fuels exhibit foaming during transfer operations, such as filling a vehicle's fuel tank at a filling station. In the processing, transportation and storage of hydrocarbon liquids, it is frequently observed that foaming occurs as the liquid is passed from one vessel to another. For example, as liquid hydrocarbon fuel is passed quickly into a storage tank a foam may develop at the surface of the fuel and, in many cases, the extent of foaming is sufficiently significant and persistent to require a reduction in the rate of passage of the liquid fuel into the vessel. It is highly desirable to provide means for controlling foaming so as to permit high rates of passage.

There are a number of patents which disclose compositions which reduce or eliminate foam in hydrocarbon liquids. For example Moorehouse et al. in U.S. Pat. No. 3,233,986 discloses siloxane polyoxyalkylene block copolymers having groups represented by the formula $R_bSiO_{4-b/2}$ wherein R is a monovalent hydrocarbon group or a divalent hydrocarbon group and b has a value from 1 to 3 inclusive, and groups having the formula

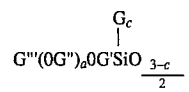

or having the formula

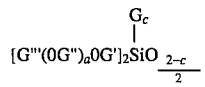

wherein G''' is a member selected from the group consisting of the hydrogen atom and the monovalent hydrocarbon groups, G'' is an alkylene radical containing at least two carbon atoms, G' is a divalent hydrocarbon radical, G is a monovalent hydrocarbon radical, n has a value of at least two and c has a value from 0 to 2 inclusive. Moorehouse et al. discloses that these siloxane polyoxyalkylene block copolymers are useful in reducing the tendency of various hydrocarbon liquids such as kerosene, gasoline, or diesel fuel to foam.

Adams et al in U.S. Pat. No. 4,690,668 discloses a method of controlling foaming of liquid hydrocarbon fuels such as diesel fuel and jet fuel by inclusion therein of certain siloxane polyoxyalkylene copolymers as antifoam agents. Adams et al. further discloses that the copolymers have an average molecular formula such that the oxyalkylene groups of the copolymer provide from about 25% to about 65% by weight of the copolymer.

Callaghan et al. in U.S. Pat. No. 4,711,714 discloses water-insoluble siloxane polyoxyalkylene graft copolymers which are effective antifoam agents for reducing foaming in crude oil/gas separators. Callaghan et al. discloses that the copolymers are particularly useful in breaking microgas dispersions and foams resulting from crude oils with a high gas to oil ratio.

German Patent Specification No. 4032006 discloses a process for defoaming and/or degassing organic systems by adding to the organic system an antifoaming agent containing an organopolysiloxane having siloxane units of the formula

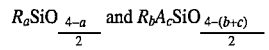

where R is a monovalent hydrocarbon radical having 1 to 182 carbon atoms per radical and A denotes a radical the general formula

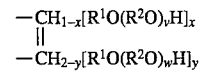

where $R^1$ denotes a radical of the formula $—CR^3H—$ with $R^3$ being a hydrogen atom or a monovalent organic radical, $R^2$ denotes a radical of the formula $—CR^4H—CH_2—$ or $—CH_2CH_2CH_2—$ where $R^4$ denotes a hydrogen atom or a monovalent organic radical, v and w at any given time are 0 or a whole number and the sum of v+w on average is 0 to 16, x and y at any given time are 0 or 1 and the sum of x+y is 1 or 2, a is 1–3, b is 0–2, and c is 1 or 2 and the sum of b+c is not greater than 3. It is further disclosed that these organopolysiloxanes are especially useful as foam suppressants or degassing agents in diesel oils, jet fuels, and crude oils.

German Patent Specification No. 4325359 discloses a process for defoaming and/or degassing organic systems by adding to the organic system an antifoaming agent containing an organopolysiloxane having siloxane units of the formula

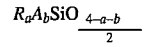

where R is an SiC bound monovalent hydrocarbon radical having 1 to 18 carbon atoms per radical and A denotes a radical the general formula

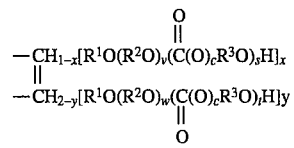

where $R^1$ denotes a divalent hydrocarbon radical having 1 to 6 carbon atoms, $R^2$ denotes a divalent hydrocarbon radical having 2 to 4 carbon atoms, $R^3$ denotes a divalent hydrocarbon radical having 2 to 6 carbon atoms, c, x, and y are 0 or 1, v, w, s, and t are 0 or an integer such that v+w is 0 to 16, s+t is 1–20, x+y is 1 or 2, a is 1–3, b is 0–2, and a+b is 3 or less. It is further disclosed that these organopolysiloxanes are especially useful as foam suppressants or degassing agents in diesel oils, jet fuels, and crude oils.

German Patent Specification No. 4343235 discloses organofunctional polysiloxanes having a mixture of radicals, the first radical being selected from (a) the radical

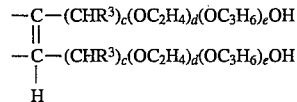

wherein $R^3$ is hydrogen or an alkyl radical, c is a number from 1 to 20, d is a number from 0 to 50, and e is a number from 0 to 50, (b) the radical $—(CH_2)_fOR^4$ where $R^4$ is hydrogen or a monovalent organic radical and f is a number from 3 to 20, and (c) the radical $(CH^2)_g(OC_2H_4)_h(OC_3H_6)_iOR^5$ where $R^5$ is hydrogen or a monovalent organic radical, g is a number from 3 to 6, h is a number from 1 to 50, and i is a number from 0 to 20, and the second radical being selected from (d) the radical

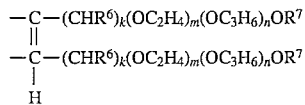

where $R^6$ is a hydrocarbon radical or an alkyl radical, $R^7$ is an alkyl radical, an acyl radical, or a trialkylsilyl radical, k is a number from 1 to 20, m is a number 0 to 50, and n is a number from 0 to 50, (e) the radical $—(CH_2)_oCH_3$ where o is a number from 5 to 30, or (f) the radical $—(CH_2)_g(OC_2H_4)_h(OC_3H_6)_iOR^5$ where $R^5$ is hydrogen or a monovalent organic radical, g is a number from 3 to 6, h is a number from 0 to 35, and i is a number from 1 to 50. These organopolysiloxanes are disclosed as being useful for defoaming diesel fuel in amounts of 0.5 to 50 ppm with respect to diesel fuel.

Fey et al. in U.S. Pat. No. 5,397,367 discloses organosilicon materials that are density matched to the hydrocarbon medium and also act as foam control agents in hydrocarbon fuel, specifically as described therein for diesel fuel. These new foam control agents are disclosed as being crosslinked organopolysiloxane-polyoxyalkylene polymers. Fey et al. further discloses that these polymers have the characteristic of being slightly soluble or insoluble in water and hydrocarbon fuels.

The use of conventional silicone polyethers, which because of their higher density relative to hydrocarbon fuel can settle out of the fuel over time, potentially renders them less effective without periodic agitation to re-disperse them. Conventional silicone polyethers also can suffer from the fact that they tend to be more soluble or dispersible in water, a constant component of hydrocarbon fuels. In storage tanks, water tends to coalesce, forming a layer at the bottom of the tank. As the silicone polyether settles due to gravity and its insolubility in the hydrocarbon, eventual contact with the water layer can result in its being absorbed into or complexed as a result of its surfactancy with that phase, thus irreversibly removing it from the fuel entirely.

A number of proposals have been made for controlling foaming of various grades of hydrocarbon liquids by use of additives: for example, silicone products as described above. However, the reduction of foaming in diesel fuels by the use of technically acceptable silicone additives has not been completely resolved prior to this invention.

SUMMARY OF THE INVENTION

The present invention relates to arylalkyl modified silicone polyethers and to their use as foam control agents in hydrocarbon liquids.

It is an object of the present invention to produce organopolysiloxanes which are useful as foam control agents in diesel fuels and jet fuels.

It is another object of this invention to produce organopolysiloxane foam control agents which display consistent compatibility and miscibility with fuel additive formulations.

It is another object of the present invention to employ organopolysiloxane foam control agents which are sparingly soluble or only dispersible in water.

It is a further object of the present invention to provide organopolysiloxane foam control agents which do not lose their defoaming capability during storage as readily as conventional silicone polyethers.

DETAILED DESCRIPTION OF THE INVENTION

The present invention relates to an organopolysiloxane compound having its formula selected from
(i) $RR^1R^2SiO(R_2SiO)_a(RR^1SiO)_b(RR^2SiO)_cSiRR^1R^2$,
(ii) $RR^1R^2SiO(R_2SiO)_a(RR^2SiO)_cSiRR^1R^2$,
(iii) $RR^1R^2SiO(R_2SiO)_a(RR^1SiO)_bSiRR^1R^2$, or
(iv) $RR^1R^2SiO(R^2SiO)_aSiRR^1R^2$
wherein R is a monovalent hydrocarbon group having from 1 to 20 carbon atoms, $R^1$ is R or a group having its formula selected from (v) $—R^3—O—(CH_2CH_2O)_d—(CH_2\overset{CH_3}{\overset{|}{C}}HO)_e—R^4$, (vi) $—R^3—O—(CH_2CH_2O)_d—R^4$, or (vii) $—R^3—O—(CH_2\overset{CH_3}{\overset{|}{C}}HO)_e—R^4$ wherein $R^3$ is a divalent hydrocarbon group having from 1 to 20 carbon atoms, $R^4$ is selected from a hydrogen atom, an alkyl group, an aryl group, or an acyl group, d has a value of from greater than zero to 150, and e has a value of from greater than zero to 150, $R^2$ is selected from R, a group having the formula $—R^3—C_6H_5$, or a group having the formula $—R^3—O—C_6H_5$ wherein $R^3$ is as defined above, a has a value of from greater than zero to 1000, b has a value of from greater than zero to 100, and c has a value of greater than zero to 100, with the proviso that there is at least one group having its formula selected from formula (v), (vi), or (vii) as defined above, and at least one group having its formula selected from $—R^3—C_6H_5$ or $—R^3—O—C_6H_5$ per molecule.

In the formulas above, R is a monovalent hydrocarbon group having from 1 to 20 carbon atoms. Monovalent hydrocarbon radicals include alkyl groups, such as methyl, ethyl, propyl, butyl, hexyl, octyl, and decyl, cycloaliphatic groups, such as cyclohexyl; aryl groups, such as phenyl, tolyl, and xylyl, and aralkyl groups, such as benzyl and phenylethyl. It is preferred that the monovalent hydrocarbon radicals for R are methyl and phenyl. The several R radicals can be identical or different, as desired.

The group $R^3$ is a divalent hydrocarbon group having from 1 to 20 carbon atoms which is exemplified by groups such as alkylene groups including methylene, ethylene, propylene, butylene, pentylene, trimethylene, 2-methyltrimethylene, pentamethylene, hexamethylene, 3-ethyl-hexamethylene, octamethylene, $—CH_2(CH_3)CH—$, $—CH_2CH(CH_3)CH_2—$, $—(CH_2)_{18}—$, and cycloalkylene radicals such as cyclohexylene, arylene radicals such as phenylene, combinations of divalent hydrocarbon radicals such as benzylene ($—C_6H_4CH_2—$), and oxygen containing groups such as $—CH_2OCH_2—$, $—CH_2CH_2CH_2OCH_2—$, $—CH_2CH_2OCH_2CH_2$, $—COOCH_2CH_2OOC—CH_2CH_2OCH(CH_3)CH_2$, and $—CH_2OCH_2CH_2OCH_2CH_2—$. Preferred alkylene groups are those having from 2 to 8 carbon atoms.

The group $R^4$ can be a hydrogen atom, an alkyl group, an aryl group, or an acyl group. The alkyl groups are exemplified by methyl, ethyl, propyl, butyl, hexyl, octyl, and decyl. The aryl groups are exemplified by phenyl, tolyl, and xylyl. The acyl groups can have from 1 to 20 carbon atoms and include groups such as acetyl, propionyl, butyryl, isobutyryl, lauroyl, myristoyl, and stearoyl 3-carboxypentadecanoyl. Preferably the acyl group is exemplified by a group having the formula —$OCR^5$ wherein $R^5$ denotes a monovalent hydrocarbon group. The monovalent hydrocarbon groups of $R^5$ are as delineated above for R. It is preferred that $R^5$ is a lower alkyl group such as methyl, ethyl, or butyl.

Preferably a has a value of 1 to 200, b has a value of 1 to 40, and c has a value of from greater than zero to 40. Preferably d has a value of 1 to 50, and e has a value of 1 to 50.

It is also within the scope and spirit of the present invention that other alkylene oxide units such as butylene oxide can also be present in groups having the formula (v), (vi), or (vii) as defined above. Furthermore, it is also within the scope of the present invention that groups having the formula (v), (vi), or (vii) or groups having the formula —$R^3$—$C_6H_5$ or —$R^3$—O—$C_6H_5$ can be bonded to silicon through oxygen (i.e. bonded to silicon via an SiOC bond).

Preferred compounds of this invention have their formula selected from

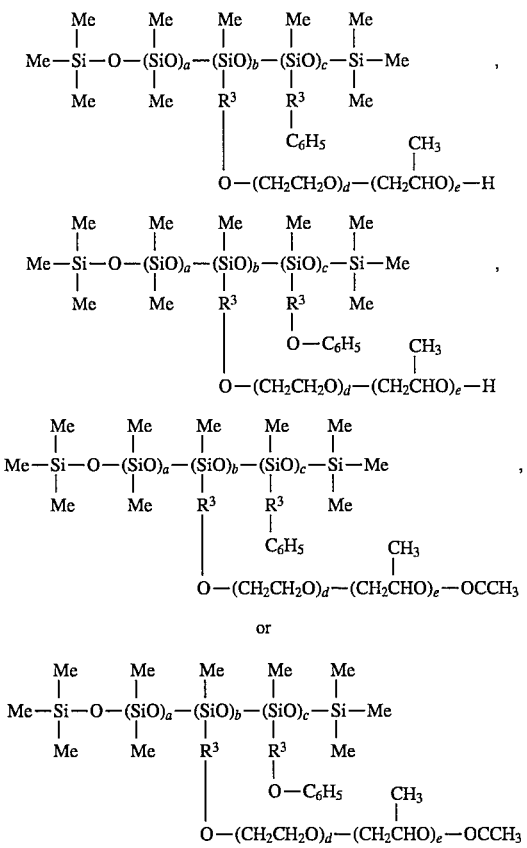

wherein Me denotes methyl, a has a value of 1 to 200, b has a value of from greater than zero to 40, c has a value of from greater than zero to 40, $R^3$ is an alkylene group having from 2 to 8 carbon atoms, d has a value of 0 to 50, and e has a value of 0 to 50 with the proviso that the value of d+e is at least one.

The present invention further relates to a composition comprising (A) a hydrocarbon fuel, and (B) an organopolysiloxane having its formula selected from (i) $RR^1R^2SiO(R_2SiO)_a(RR^1SiO)_b(RR^2SiO)_cSiRR^1R^2$,
(ii) $RR^1R^2SiO(R_2SiO)_a(RR^2SiO)_c{}^{SiRR^1}R^2$,
(iii) $RR^1R^2SiO(R_2SiO)_a(RR^1SiO)_bSiRR^1R^2$, or
(iv) $RR^1R^2SiO(R_2SiO)_aSiRR^1R^2$ wherein R is a monovalent hydrocarbon group having from 1 to 20 carbon atoms, $R^1$ is R or a group having its formula selected from

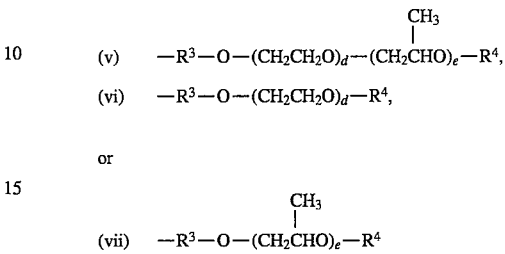

wherein $R^3$ is a divalent hydrocarbon group having from 1 to 20 carbon atoms, $R^4$ is selected from a hydrogen atom, an alkyl group, an aryl group, or an acyl group, d has a value of from greater than zero to 150, and e has a value of from greater than zero to 150, $R^2$ is selected from R, a group having the formula —$R^3$—$C_6H_5$, or a group having the formula —$R^3$—O—$C_6H_5$ wherein $R^3$ is as defined above, a has a value of from greater than zero to 1000, b has a value of from greater than zero to 100, and c has a value of greater than zero to 100, with the proviso that there is at least one group having its formula selected from formula (v), (vi), or (vii) as defined above, and at least one group having its formula selected from —$R^3$—$C_6H_5$ or —$R^3$—O—$C_6H_5$ per compound.

The hydrocarbon fuels of component (A) include fuels such as diesel fuel and jet fuel. The hydrocarbon fuel is preferably a diesel fuel used as a fuel for motor vehicles, e.g. cars and heavy goods vehicles, and marine use, or a jet fuel. By the expression "diesel fuel" where used herein is meant gas oil and fuel oil including those materials which are referred to as light domestic and heating oils and diesel fuel and irrespective of whether they are intended for vehicular, marine, heating or other use. These materials are loosely characterized as having a viscosity of not more than 115" Redwood 1 at 38° C. and a boiling point in the range of about 200° C. to about 380° C. Particularly embraced within the expression are those hydrocarbon liquids having a viscosity of about 30 to 40" Redwood at 38° C., including those having a viscosity at 20° C. in the range of about 2.9 to about 10.2 mm²/s, and at 38° C. in the range of about 1.6 to about 6.0 mm²/s. Further, these materials have a carbon residue (Conradson) of <0.2% by weight, a water content of <0.05% by weight, a sulphur content of <1.0% by weight and a net calorific value of about 10100 to about 10300 Kcal/Kg.

By the expression "jet fuel" where used herein is meant kerosene, light oils and medium oils for example that known as AVTUR fuel. AVTUR fuel is a medium oil distilling between 150° and 300° C. that distills at least 65% in volume at 250°, has a flash point above 38° C, has a maximum aromatic content of 20% by volume, has been treated to have a kinematic viscosity of less than 15 mm²/s at −34° C. and has a freezing point not greater and −50° C.

The hydrocarbon fuels of component (A) may also be, for example, residual fuel oils having a viscosity at 38° C. of greater than 115" Redwood 1, light medium and heavy naphtha, vaporizing oils, motor oils, and motor spirits.

Component (B) in the compositions of this invention is as described above for the organopolysiloxane compounds of this invention including preferred embodiments thereof.

The organopolysiloxane copolymers of the present invention may be added to the hydrocarbon fuel in any desired quantity and incorporated into the hydrocarbon liquid in any suitable manner. The copolymers are added to the hydrocarbon liquid in the form of a solution or dispersion. The preferred copolymers are effective to reduce the tendency of hydrocarbon liquids to foam when used in quantities of 100 parts per million or less, for example in the range from about 1 to about 50 ppm by volume, the most preferred copolymers being effective when used in quantities of from 1 to 20 ppm by volume of the fuel.

Frequently hydrocarbon liquids also comprise various "additive packages". The additive packages contain corrosion inhibitors, anti-scaling agents, octane improvers, emulsifiers, detergents, demulsifiers, and/or drying agents to counteract water absorbed by the fuel during normal transfer operations and use conditions, etc. to improve overall engine performance and thus it is within the scope of the present invention that these types of additives may also be present in the compositions of this invention. The types and quantities of these additives are well known to those skilled in the art.

The organopolysiloxanes of this invention are particularly beneficial in the control of foaming of hydrocarbon liquids and especially diesel fuels as they are pumped rapidly from one vessel to another in the presence of air, and possibly in the presence of water. Such circumstances may occur for example during transfer of materials though a supply pipe from one vessel to another, as required during separation of various grades of hydrocarbon liquids from crude oil or separation of various grades of hydrocarbon liquid from selected feedstocks, and in transfer of hydrocarbon liquids from road tankers to static storage tanks.

The organopolysiloxane foam control agents may be added directly to the hydrocarbon fuel, or may be predispersed in a predispersant such as the hydrocarbon liquid, xylene, toluene, naphtha, and other aromatic compounds, various ketones, esters, ethers, and other commonly used organic solvents.

The following examples are disclosed to further teach, but not limit, the invention which is properly delineated by the appended claims.

EXAMPLE 1

Compound A was prepared by placing about 73.85 grams of an organohydrogenpolysiloxane having the formula $Me_3SiO(Me_2SiO)_{8.6}(MeHSiO)_{3.6}SiMe_3$ wherein Me hereinafter denotes methyl in a flask and then applying heat to the flask. When the organohydrogenpolysiloxane reached a temperature of 50° C., a 0.1 mole percent solution of chloroplatinic acid was added to the flask. When the temperature of the solution reached 70° C., about 5 grams of alpha-methylstyrene was added dropwise to the catalyzed siloxane. When the addition was complete, the solution was heated to 100° C. This temperature was then maintained for one hour. The solution was then cooled to room temperature. Next, about 95 grams of allyl oxyethylene glycol containing on average 7 oxyethylene units per molecule was added to the solution along with about 43.46 grams of isopropanol and this mixture was then heated. The solution was allowed to reflux for 50 minutes after it was heated. The heat was then removed and then the isopropanol was removed by vacuum stripping the solution.

Compound B was prepared in the same manner as compound A above, except that about 107.08 grams of the organohydrogenpolysiloxane, 25 grams of the alpha-methylstyrene, 75 grams of the allyl oxyethylene glycol, and 51.77 grams of isopropanol were used in the reaction. Compound C was prepared in the same manner as compound A above, except that about 115.9 grams of the organohydrogenpolysiloxane, no allyl oxyethylene glycol, and 50 grams of alpha-methylstyrene was used in the reaction.

Compound D was prepared according to the disclosure of U.S. Pat. No. 4,690,688.

The resulting organopolysiloxane compounds had the following average formula:

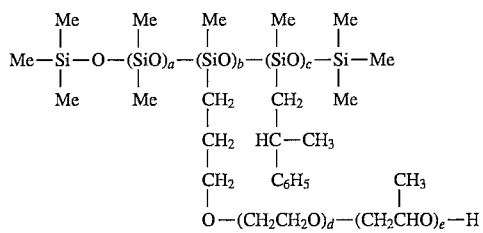

wherein a, b, c, d, and e are defined in the following Table:

TABLE 1

| Compound | a | b | c | d | e |
|---|---|---|---|---|---|
| A | 8.6 | 3.4 | 0.2 | 7 | 0 |
| B | 8.6 | 2.7 | 0.9 | 7 | 0 |
| C | 8.6 | 0 | 3.6 | 0 | 0 |
| D | 8.6 | 3.6 | 0 | 7 | 0 |

Compounds A, B, C, and D where then individually mixed with a typical diesel fuel additive denoted "Additive X1". The concentration of each organopolysiloxane compound was 1.6 weight percent in the additive. The compatibility of each of the compounds in the additive was then tested. The additive and compound was determined to be compatible if the mixture of the organopolysiloxane compound and the fuel additive yielded a clear solution. If the resulting solution was cloudy then there was no compatibility. The results of the compatibility test are described in Table 2 hereinbelow.

TABLE 2

| Mixture | Compatibility |
|---|---|
| A | NO |
| B | YES |
| C | YES |
| D | NO |

EXAMPLE 2

Compound E was prepared according to the procedure described in Example 1, except that 100 grams of an organohydrogenpolysiloxane having the formula $Me_3SiO(Me_2SiO)_{117}(MeHSiO)_{9.5}SiMe_3$ replaced the organohydrogensiloxane of Example 1, about 1.53 grams of allyl phenyl ether replaced the alpha-methylstyrene of Example 1, 197.77 grams of an allyl polyoxyethylene-polyoxypropylene acetate copolymer containing on average 18 oxyethylene units per molecule and 18 oxypropylene units per molecule replaced the allyl oxyethylene glycol of Example 1, and 99.75 grams of isopropanol were used in the reaction.

Compound F was prepared in the same manner as compound E above, except that about 100 grams of the organohydrogenpolysiloxane, 4.58 grams of the allyl phenyl ether, 154.14 grams of the allyl polyoxyethylene-polyoxypropylene acetate copolymer, and 86.24 grams of isopropanol were employed in the reaction.

Compound G was prepared in the same manner as compound E above, except that about 100 grams of the organohydrogenpolysiloxane, no allyl polyoxyethylene-polyoxypropylene acetate copolymer, and 15.37 grams of allyl phenyl ether were used in the reaction.

The resulting organopolysiloxane compounds had the following average formula:

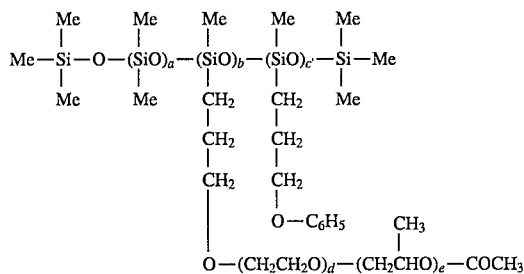

wherein a, b, c', d and e are defined in the following Table:

TABLE 3

| Compound | a | b | c' | d | e |
|---|---|---|---|---|---|
| E | 117 | 8.6 | 0.9 | 18 | 18 |
| F | 117 | 6.7 | 2.8 | 18 | 18 |
| G | 117 | 0 | 9.5 | 0 | 0 |

Compounds E, F, and G where then individually mixed with a typical diesel fuel additive denoted "Additive X1". The concentration of each compound was 1.6 weight percent in the additive. The compatibility of the compounds in the additive was then tested. The additive and compound was determined to be compatible if the mixture of the organopolysiloxane compound and the fuel additive yielded a clear solution. If the resulting solution was cloudy then there was no compatibility. The results are described in Table 4 below.

TABLE 4

| Mixture | Compatibility |
|---|---|
| E | Opaque |
| F | Opaque |
| G | Cloudy |

Table 4 shows that the additive containing Compound E and the additive containing Compound F had improved compatibility in the diesel fuel additive in comparison to the additive containing Compound G (which was an organopolysiloxane compound which did not contain a polyether group).

Each of the compound-additive mixtures prepared above were then individually mixed with diesel fuel and stored in separate metal paint cans. The concentration of each of the organopolysiloxane compounds in their respective containers was 10 parts per million (ppm) based on the total weight of the fuel. The fuels containing Compounds E, F, G, respectively were then each subjected to a Shake Test. In the Shake Test, fifty cc's of the fuel from each of the cans were pipetted into separate 100 cc graduated cylinders. The cylinders were then stopped with a glass stopper and the contents shaken 100 times during a one minute period. The foam volume immediately after shaking had stopped was recorded and the amount of time required for the foam to break and expose a clear section of liquid was measured. The results of the test are disclosed in Table 5 below.

TABLE 5

| Fuel | DAY 1 Break Time | DAY 8 Break Time |
|---|---|---|
| E | 34 sec. | 34 sec. |
| F | 33 sec. | 25 sec. |
| G | >120 sec. | >120 sec. |

Table 5 shows that the fuel containing Compound E and the fuel containing Compound F have superior break times relative to the fuel containing an organopolysiloxane compound which did not contain a polyether group (compound G). The defoaming performance of Fuels E and F was sustained over an 8 day period.

EXAMPLE 3

Compound H was prepared according to the disclosure of U.S. Pat. No. 3,233,986.

Compound I was prepared according to the procedure of Example 1, except that 76 grams of an organohydrogenpolysiloxane having the formula $Me_3SiO(Me_2SiO)_{157}(MeHSiO)_{21}SiMe_3$ replaced the organohydrogensiloxane of Example 1, 0.4 grams of alpha-methylstyrene, 123.6 grams of an allyl polyoxyethylene-polyoxypropylene glycol copolymer containing on average 10 oxyethylene units per molecule and 4 oxypropylene units per molecule replaced the allyl oxyethylene glycol of Example 1, and 62.5 grams of isopropanol were used in the reaction.

Compound J was prepared in the same manner as compound I above, except that about 77.4 grams of the organohydrogenpolysiloxane, 0.8 grams of the alpha-methylstyrene, 121.8 grams of the allyl polyoxyethylene-polyoxypropylene glycol copolymer, and 67 grams of isopropanol were used in the reaction.

Compound K was prepared in the same manner as compound I above, except that about 78.6 grams of the organohydrogenpolysiloxane, 1.2 grams of the alpha-methylstyrene, 120 grams of the allyl polyoxyethylene-polyoxypropylene glycol copolymer, and 66.6 grams of isopropanol were used in the reaction.

Compound L was prepared in the same manner as compound I above, except that about 80.6 grams of the organohydrogenpolysiloxane, 1.8 grams of the alpha-methylstyrene, 117.6 grams of the allyl polyoxyethylene-polyoxypropylene glycol copolymer, and 66.6 grams of isopropanol were used in the reaction.

Compound M was prepared in the same manner as compound I above, except that about 82.6 grams of the organohydrogenpolysiloxane, 2.6 grams of the alpha-methylstyrene, 114.8 grams of the allyl polyoxyethylene-polyoxypropylene glycol copolymer, and 67 grams of isopropanol were used in the reaction.

Compound N was prepared in the same manner as compound I above, except that about 84.6 grams of the organohydrogenpolysiloxane, 3.4 grams of the alpha-methylstyrene, 112 grams of the allyl polyoxyethylene-polyoxypropylene glycol copolymer, and 67 grams of isopropanol were used in the reaction.

Compound O was prepared in the same manner as compound I above, except that about 83.9 grams of the organohydrogenpolysiloxane, no allyl polyoxyethylene-polyoxypropylene glycol copolymer was used, and 16.1 grams of alpha-methylstyrene were used in the reaction.

The resulting organopolysiloxane compounds had the following average formula:

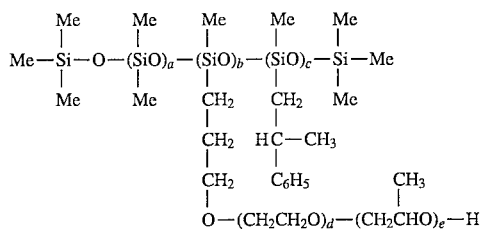

wherein a, b, c, d, and e are defined in the following Table:

TABLE 6

| Compound | a | b | c | d | e |
|---|---|---|---|---|---|
| H | 157 | 21.0 | 0 | 10 | 4 |
| I | 157 | 20.6 | 0.4 | 10 | 4 |
| J | 157 | 20.2 | 0.8 | 10 | 4 |
| K | 157 | 19.3 | 1.7 | 10 | 4 |
| L | 157 | 18.5 | 2.5 | 10 | 4 |
| M | 157 | 17.6 | 3.4 | 10 | 4 |
| N | 157 | 16.8 | 4.2 | 10 | 4 |
| O | 157 | 0 | 21.0 | 0 | 0 |

Compounds H-L were then individually mixed with a typical diesel fuel additive denoted "Additive X2". The concentration of the each compound was 1.6 weight percent in the additive. Next, each of the compound-additive mixtures prepared above were then individually mixed with an off-highway diesel fuel having a sulfur content of about 1%. The concentration of each of the compounds in the diesel fuel was about 8 parts per million (ppm) based on the total weight of the fuel. The fuels containing compounds H-L, respectively, and a fuel control as defined above were each subjected to the Shake Test described in Example 2. The foam height of each fuel was then converted to a "Percent Foam Volume" using the following formula, which is relative to the original liquid volume of 50 cc: 100×{(recorded liquid and foam volume–50 cc)/50 cc}="Percent Foam Volume". The results of the test are disclosed in Table 7 below.

TABLE 7

| | DAY 1 | |
|---|---|---|
| Fuel | % Foam Volume | Break Time |
| FUEL CONTROL | +29% | 20 sec. |
| H | 0% | 0 sec. |
| I | 0% | 0 sec. |
| J | 0% | 0 sec. |
| K | 0% | 0 sec. |
| L | 0% | 0 sec. |

Table 7 shows that the fuel containing a compound of this invention such as Compound I, J, K, or L provided equivalent foam volume percentages and break times to a fuel containing a prior art compound (compound H) and was superior to an untreated diesel fuel and thus are effective foam control agents.

Compounds M, N, and O were then individually added to the same fuel additive and same diesel fuel at the same concentrations as Compounds H-L and then were tested along with the fuel control for % foam volume and break time in the same manner as Compounds H-L and the fuel control above, except that in this case the test was run using 100 cc's of each fuel and this amount was then pipetted into separate 250cc graduated cylinders. The results of the test are disclosed in Table 8 below.

TABLE 8

| | DAY 1 | | DAY 8 | |
|---|---|---|---|---|
| Fuel | % Foam Volume | Break Time | % Foam Volume | Break Time |
| FUEL CONTROL | — | — | +29% | 46 sec. |
| M | 0% | 0 sec. | 0% | 0 sec. |
| N | 0% | 0 sec. | 0% | 0 sec. |
| O | +31% | 81 sec. | — | — |

Table 8 shows that the fuel containing Compound M and the fuel containing Compound N were superior in % foam volume and break time in comparison to the untreated diesel fuel and in comparison to a fuel containing an organopolysiloxane compound which did not contain a polyether group (Compound O).

EXAMPLE 4

Compound P was prepared according to the disclosure of U.S. Pat. No. 4,690,688.

Compound Q was prepared according to the procedure described in Example 1, except that 96.6 grams of an organohydrogenpolysiloxane having the formula $Me_3SiO(Me_2SiO)_{13.5}(MeHSiO)_{1.9}SiMe_3$ replaced the organohydrogensiloxane of Example 1, 0.4 grams of alpha-methylstyrene, 103.2 grams of an allyl oxyethylene glycol containing on average 12 oxyethylene units per molecule replaced the allyl oxyethylene glycol of Example 1, and 67 grams of isopropanol were used in the reaction.

Compound R was prepared in the same manner as compound Q above, except that about 97.8 grams of the organohydrogenpolysiloxane, 0.8 grams of the alpha-methylstyrene, 101.4 grams of the allyl oxyethylene glycol, and 67 grams of isopropanol were used in the reaction.

Compound S was prepared in the same manner as compound Q above, except that about 89.4 grams of the organohydrogenpolysiloxane, 109.2 grams of allyl oxyethylene glycol, and 1.4 grams of the alpha-methylstyrene were used in the reaction.

The resulting organopolysiloxane compounds had the following average formula:

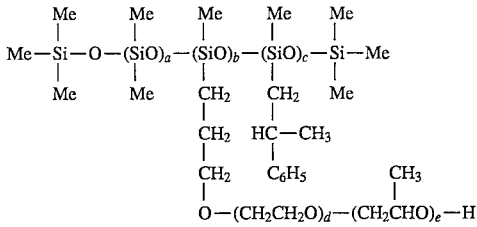

wherein a, b, c, d, and e are defined in the following Table:

TABLE 9

| Compound | a | b | c | d | e |
|---|---|---|---|---|---|
| P | 13.5 | 1.90 | 0 | 12 | 0 |
| Q | 13.5 | 1.88 | 0.02 | 12 | 0 |
| R | 13.5 | 1.86 | 0.04 | 12 | 0 |
| S | 13.5 | 1.82 | 0.08 | 12 | 0 |

Compounds P-S were then individually mixed with diesel fuel additive "Additive X2", the concentration of each compound was 1.6 weight percent in the additive. Next, each of the compound-additive mixtures prepared above were then mixed with a commercial diesel fuel having a low sulfur content. The concentration of each of the antifoam compounds in the diesel fuel was about 8 parts per million (ppm) based on the total weight of the fuel. The fuels containing Compounds P-S, respectively, and a fuel control as defined above were then subjected to the Shake Test described in Example 2 and the percent Foam Volume was calculated according to the procedure described in Example 3. The results of the tests are disclosed in Table 10 below.

TABLE 10

| Fuel | DAY 1 | |
|---|---|---|
| | % Foam Volume | Break Time |
| FUEL CONTROL | +35% | 13 sec. |
| P | +23% | 3 sec. |
| Q | +26% | 4 sec. |
| R | +37% | 6 sec. |
| S | +38% | 6 sec. |

Table 10 shows that fuels containing a compound of this invention such as Compound Q, R, or S provided nearly equivalent foam volume percentages to the untreated fuel and to a fuel containing a prior art compound (Compound P) and equivalent break times to the fuel containing the prior art compound. However, fuels containing one of the compounds of this invention had superior break times when compared to the untreated diesel fuel and thus were effective foam control agents.

EXAMPLE 5

Compound T was prepared according to the disclosure of U.S. Pat. No. 3,233,986.

Compound U was prepared according to the procedure of Example 1, except that 81.4 grams of an organohydrogenpolysiloxane having the formula $Me_3SiO(Me_2SiO)_{64}(MeHSiO)_8SiMe_3$ replaced the organohydrogensiloxane of Example 1, 0.4 grams of alpha-methylstyrene, 118.4 grams of an allyl polyoxyethylene-polyoxypropylene glycol copolymer containing on average 10 oxyethylene units per molecule and 4 oxypropylene units per molecule replaced the allyl oxyethylene glycol of Example 1, and 67 grams of isopropanol were used in the reaction.

Compound V was prepared in the same manner as compound U above, except that about 79.2 grams of the organohydrogenpolysiloxane, 0.6 grams of the alpha-methylstyrene, 115.2 grams of the allyl polyoxyethylene-polyoxypropylene glycol copolymer, and 67 grams of isopropanol were used in the reaction.

Compound W was prepared in the same manner as compound U above, except that about 82.2 grams of the organohydrogenpolysiloxane, 1.0 grams of the alpha-methylstyrene, 117 grams of the allyl polyoxyethylene-polyoxypropylene glycol copolymer, and 67 grams of isopropanol were used in the reaction.

Compound X was prepared in the same manner as compound U above, except that about 83 grams of the organohydrogenpolysiloxane, 1.2 grams of the alpha-methylstyrene, 115.8 grams of the allyl polyoxyethylene-polyoxypropylene glycol copolymer, and 67 grams of isopropanol were used in the reaction.

Compound Y was prepared in the same manner as compound U above, except that about 84 grams of the organohydrogenpolysiloxane, 1.6 grams of the alpha-methylstyrene, 114.4 grams of the allyl polyoxyethylene-polyoxypropylene glycol copolymer, and 67 grams of isopropanol were used in the reaction.

Compound P was prepared as described hereinabove.

The resulting organopolysiloxane compounds had the following average formula:

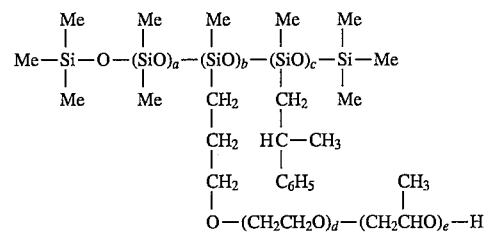

wherein a, b, c, d, and e are defined in the following Table:

TABLE 11

| Compound | a | b | c | d | e |
|---|---|---|---|---|---|
| T | 64 | 8.0 | 0 | 10 | 4 |
| U | 64 | 7.8 | 0.2 | 10 | 4 |
| V | 64 | 7.7 | 0.3 | 10 | 4 |
| W | 64 | 7.5 | 0.5 | 10 | 4 |
| X | 64 | 7.4 | 0.6 | 10 | 4 |
| Y | 64 | 7.2 | 0.8 | 10 | 4 |
| P | 13.5 | 1.9 | 0 | 12 | 0 |

Compounds T-Y and P were then individually mixed with a typical diesel fuel additive denoted "Additive X2". The concentration of each compound was 1.6 weight percent in the additive. Next, each of the compound-additive mixtures prepared above were then mixed with a diesel fuel having a high sulfur content which is used in off-highway commercial vehicles. The concentration of each of the compounds in the diesel fuel was about 8 parts per million (ppm) based on the total weight of the fuel. Fuels containing Compounds T-Y and P, respectively, and a fuel control as defined above were each subjected to the Shake Test described in Example 2. However in this case the test was run using 100 cc's of the fuel-additive-compound mixture and this amount was then pipetted into separate 250 cc graduated cylinders. The % foam volume and the break time for each fuel containing the above compounds and the fuel control were then taken for 1 day after fuel preparation and 7 days after fuel preparation and these values were then averaged. The foam height of each fuel was then converted to a "Percent Foam Volume" using the following formula, which is relative to the original liquid volume of 100 cc: 100×{(recorded liquid and foam volume−100 cc)/100cc}="Percent Foam Volume". The results of the test are reported in Table 12 below.

TABLE 12

| Fuel | % Foam Volume | Break Time |
|---|---|---|
| FUEL CONTROL | +29% | 46 sec. |
| T | +5% | 16 sec. |
| U | +6% | 18 sec. |
| V | +3% | 6 sec. |
| W | +2% | 2 sec. |
| X | +5% | 13 sec. |
| Y | +4% | 15 sec. |
| P | +11% | 23 sec. |

Table 12 shows that a fuel containing a compound of this invention such as Compound U, V, W, X, or Y provided, on average, superior foam volume percentages and break times in comparison to a fuel containing a prior art compound (Compounds P and T) and in addition were superior to an untreated diesel fuel and thus were effective foam control agents.

That which is claimed is:

1. An organopolysiloxane compound having its formula selected from (i) $RR^1R^2SiO(R_2SiO)_a(RR^1SiO)_b(RR^2SiO)_cSiRR^1R^2$, (ii) $RR^1R^2SiO(R_2SiO)_a(RR^2SiO)_cSiRR^1R^2$, (iii) $RR^1R^2SiO(R_2SiO)_a(RR^1SiO)_bSiRR^1R^2$, or (iv) $RR^1R^2SiO(R_2SiO)_aSiRR^1R^2$ wherein R is a monovalent hydrocarbon group having from 1 to 20 carbon atoms, $R^1$ is R or a group having its formula selected from (v)     $-R^3-O-(CH_2CH_2O)_d-(CH_2CHO)_e-R^4$,
                                                                          $CH_3$ (vi)    $-R^3-O-(CH_2CH_2O)_d-R^4$, or (vii)    $-R^3-O-(CH_2CHO)_e-R^4$
                               $CH_3$ wherein $R^3$ is a divalent hydrocarbon group having from 1 to 20 carbon atoms, $R^4$ is selected from a hydrogen atom, an alkyl group, an aryl group, or an acyl group, d has a value of from greater than zero to 150, and e has a value of from greater than zero to 150, $R^2$ is selected from R, a group having the formula $-R^3-C_6H_5$, or a group having the formula $-R_3-O-C_6H_5$ wherein $R^3$ is as defined above, a has a value of from greater than zero to 1000, b has a value of from greater than zero to 100, and c has a value of greater than zero to 100, with the proviso that there is at least one group having its formula selected from formula (v), (vi), or (vii) as defined above and at least one group having its formula selected from $-R^3-C_6H_5$ or $-R^3-O-C_6H_5$ per molecule.

2. A compound according to claim 1, wherein R is methyl.

3. A compound according to claim 1, wherein $R^3$ is selected from methylene, ethylene, propylene, butylene, pentylene, trimethylene, 2-methyltrimethylene, pentamethylene, hexamethylene, 3-ethyl-hexamethylene, octamethylene, $-CH_2(CH_3)CH-$, $-CH_2CH(CH_3)CH_2-$, $-(CH_2)18-$, cyclohexylene, phenylene, or benzylene.

4. A compound according to claim 1, wherein the acyl group is the group $-OCCH_3$.

5. A compound according to claim 1, wherein the organopolysiloxane compound is a compound having its formula selected from

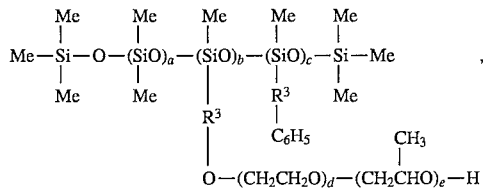

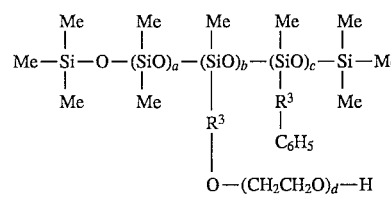

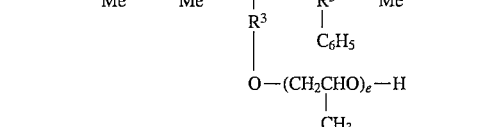

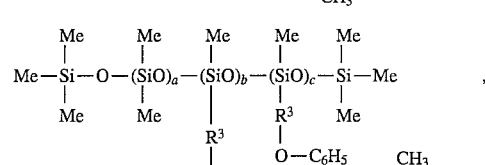

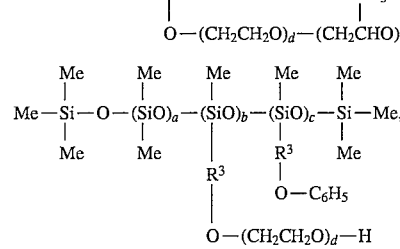

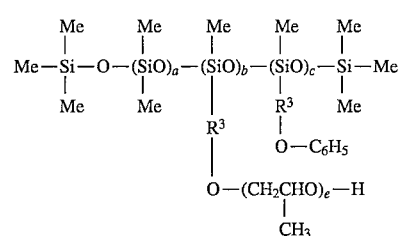

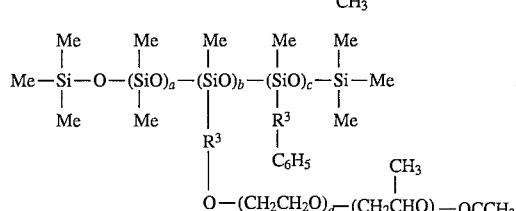

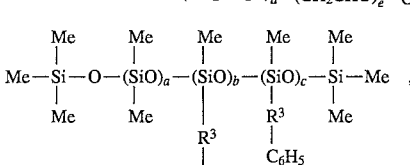

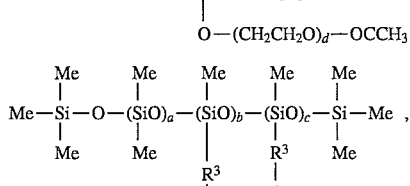

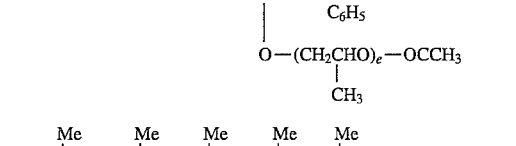

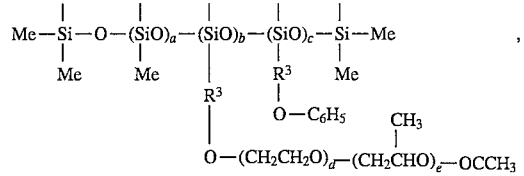

-continued

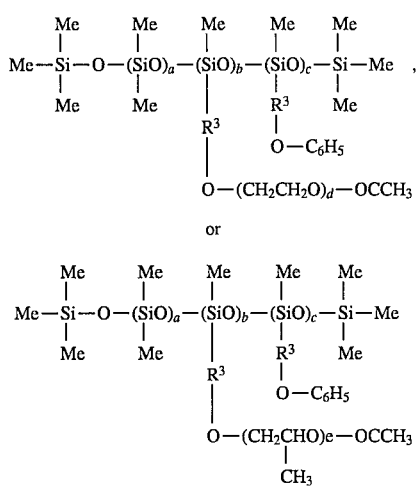

wherein Me denotes methyl, a has a value of 1 to 200, b has a value of 1 to 40, c has a value of from greater than zero to 40, $R^3$ is an alkylene group having from 2 to 8 carbon atoms, d has a value of from greater than zero to 50, and e has a value of from greater than zero to 50.

6. A composition comprising:
   (A) a hydrocarbon fuel; and
   (B) an organopolysiloxane having its formula selected from
   (i) $RR^1R^2SiO(R_2SiO)_a(RR^1SiO)_b(RR^2SiO)_cSiRR^1R^2$,
   (ii) $RR^1R^2SiO(R_2SiO)_a(RR^2SiO)_cSiRR^1R^2$,
   (iii) $RR^1R^2SiO(R_2SiO)_a(RR^1SiO)_bSiRR^1R^2$, or
   (iv) $RR^1R^2SiO(R_2SiO)_aSiRR^1R^2$ wherein R is a monovalent hydrocarbon group having from 1 to 20 carbon atoms, $R^1$ is R or a group having its formula selected from (v) $-R^3-O-(CH_2CH_2O)_d-(CH_2CHO)_e-R^4$,
   with $CH_3$ on the CHO, (vi) $-R^3-O-(CH_2CH_2O)_d-R^4$, or (vii) $-R^3-O-(CH_2CHO)_e-R^4$
   with $CH_3$ on the CHO, wherein $R^3$ is a divalent hydrocarbon group having from 1 to 20 carbon atoms, $R^4$ is selected from a hydrogen atom, an alkyl group, an aryl group, or an acyl group, d has a value of from greater than zero to 150, and e has a value of from greater than zero to 150, $R^2$ is selected from R, a group having the formula $-R^3-C_6H_5$, or a group having the formula $-R_3-O-C_6H_5$ wherein $R^3$ is as defined above, a has a value of from greater than zero to 1000, b has a value of from greater than zero to 100, and c has a value of greater than zero to 100, with the proviso that there is at least one group having its formula selected from formula (v), (vi), or (vii) as defined above and at least one group having its formula selected from $-R^3-C_6H_5$ or $-R^3-O-C_6H_5$ per compound.

7. A composition according to claim 6, wherein the hydrocarbon fuel is diesel fuel.

8. A composition according to claim 6, wherein the hydrocarbon fuel is jet fuel.

9. A composition according to claim 6, wherein R is methyl.

10. A composition according to claim 6, wherein $R^3$ is selected from methylene, ethylene, propylene, butylene, pentylene, trimethylene, 2-methyltrimethylene, pentamethylene, hexamethylene, 3-ethyl-hexamethylene, octamethylene, $-CH_2(CH_3)CH-$, $-CH_2CH(CH_3)CH_2-$, $-(CH_2)_{18}-$, cyclohexylene, phenylene, or benzylene.

11. A composition according to claim 6, wherein the acyl group is the group $-OCCH_3$.

12. A composition according to claim 6, wherein (B) is a compound having its formula selected from

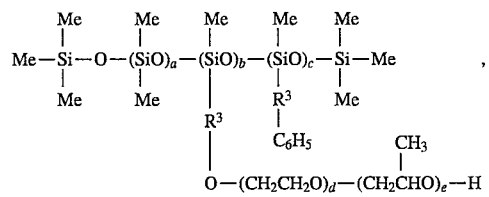

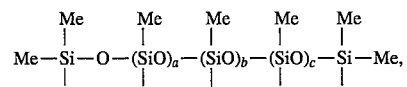

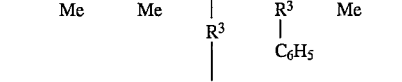

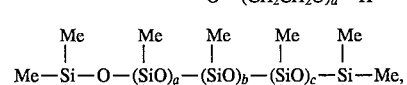

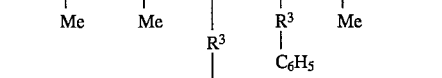

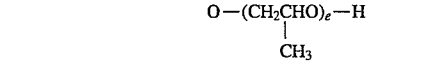

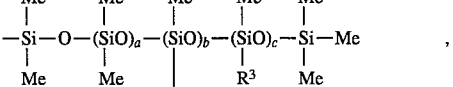

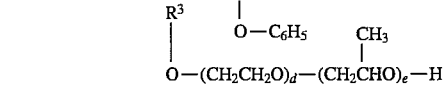

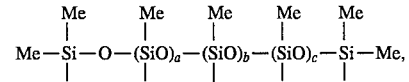

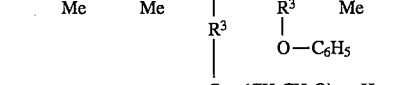

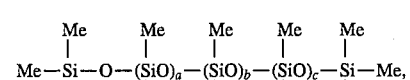

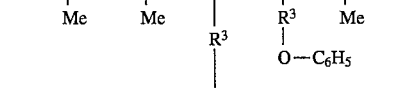

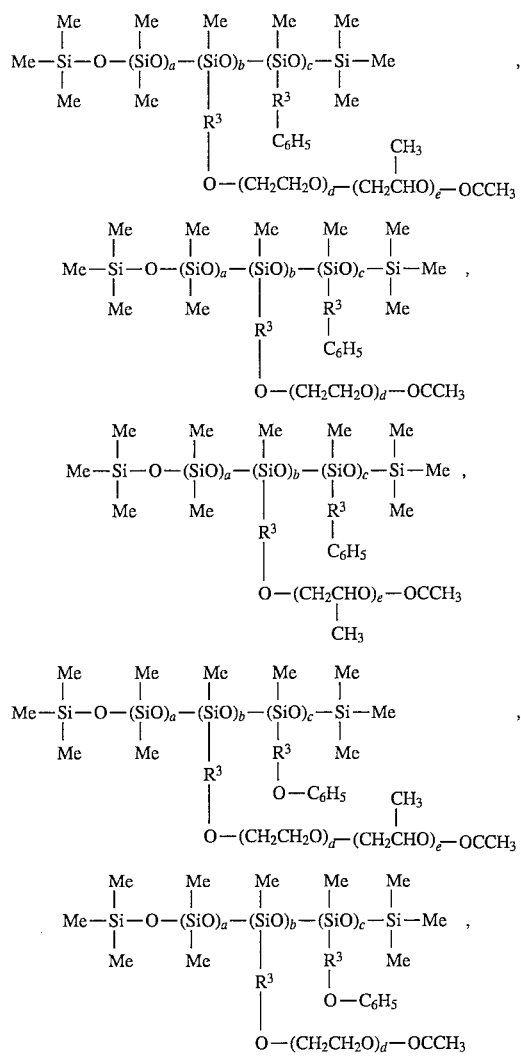

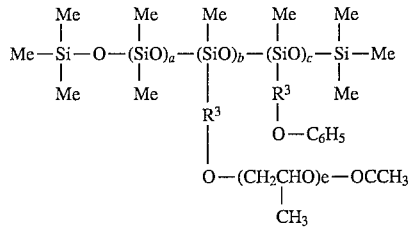

wherein Me denotes methyl, a has a value of 1 to 200, b has a value of 1 to 40, c has a value of from greater than zero to 40, $R^3$ is an alkylene group having from 2 to 8 carbon atoms, d has a value of from greater than zero to 50, and e has a value of from greater than zero to 50.

13. A composition according to claim 6, wherein the composition further comprises at least one ingredient selected from corrosion inhibitors, anti-scaling agents, octane improvers, emulsifiers, detergents, demulsifiers, or drying agents.

14. A composition according to claim 6, wherein the composition further comprises a solvent selected from xylene, toluene, naphtha, ketones, esters, or ethers.

15. A composition according to claim 13, wherein the composition further comprises a solvent selected from xylene, toluene, naphtha, ketones, esters, or ethers.

16. A composition according to claim 12, wherein the composition further comprises at least one ingredient selected from corrosion inhibitors, anti-scaling agents, octane improvers, emulsifiers, detergents, demulsifiers, or drying agents.

17. A composition according to claim 12, wherein the composition further comprises a solvent selected from xylene, toluene, naphtha, ketones, esters, or ethers.

18. A composition according to claim 16, wherein the composition further comprises a solvent selected from xylene, toluene, naphtha, ketones, esters, or ethers.

* * * * *